(12) United States Patent
Kato

(10) Patent No.: US 6,785,464 B1
(45) Date of Patent: Aug. 31, 2004

(54) MULTIPLEXING METHOD FOR CONTINUOUS REPRODUCTION OF ENCODED PICTURES DURING SKIPPING

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/454,956

(22) Filed: Dec. 3, 1999

(30) Foreign Application Priority Data

Dec. 4, 1998 (JP) .......................................... 10-345946

(51) Int. Cl.⁷ .............................................. G11B 27/00
(52) U.S. Cl. ...................................... 386/52; 386/109
(58) Field of Search .............................. 386/52, 55, 111, 386/112, 125–126, 109

(56) References Cited

U.S. PATENT DOCUMENTS

| | | | | |
|---|---|---|---|---|
| 5,534,944 A | * | 7/1996 | Egawa et al. ................. | 348/584 |
| 5,751,360 A | * | 5/1998 | Tanaka ................... | 375/240.15 |
| 5,912,709 A | * | 6/1999 | Takahashi ............... | 375/240.15 |
| 5,917,988 A | * | 6/1999 | Eto .............................. | 386/52 |
| 5,945,931 A | * | 8/1999 | Tahara et al. .................. | 341/50 |
| 5,982,436 A | * | 11/1999 | Balakrishnan et al. . | 375/240.05 |
| 6,137,946 A | * | 10/2000 | Ando ........................... | 386/52 |
| 6,240,137 B1 | * | 5/2001 | Kato ....................... | 375/240.26 |
| 6,256,451 B1 | * | 7/2001 | Mitsui .......................... | 386/52 |
| 6,301,428 B1 | * | 10/2001 | Linzer .......................... | 386/52 |
| 6,330,392 B1 | * | 12/2001 | Nakatani et al. .............. | 386/52 |
| 6,341,192 B1 | * | 1/2002 | Fujinami ...................... | 386/52 |
| 6,400,886 B1 | * | 6/2002 | Brewer et al. ................ | 386/52 |
| 6,501,901 B2 | * | 12/2002 | Yasuda et al. ................ | 386/52 |

* cited by examiner

*Primary Examiner*—Trai Tran
*Assistant Examiner*—Polin Chieu
(74) *Attorney, Agent, or Firm*—Frommer Lawrence & Haug LLP; William S. Frommer; Darren M. Simon

(57) ABSTRACT

Skipping reproduction of image data is performed while maintaining the continuity of a moving image before and after a skipping point, thereby preventing the video buffer in the decoder from failing. A moving image recording and reproducing apparatus for such skipping reproduction includes a decoder to decode an MPEG-2 video stream recorded on an optical disc and an encoder to re-encode the decoded video stream by editing. A multiplexer multiplexes the edited video stream and an audio stream, and an analysis controller controls the editing. To generate a multiplexed stream which can be reproduced by skipping from a first video stream to a second video stream, the analysis controller limits the re-encoding so that the bit occupancy in the video buffer is smaller than the capacity of the video buffer and larger than zero for a time period starting with the supply of the second video stream to the video buffer of the decoder and ending with the beginning of the decoding of the second video stream.

3 Claims, 11 Drawing Sheets

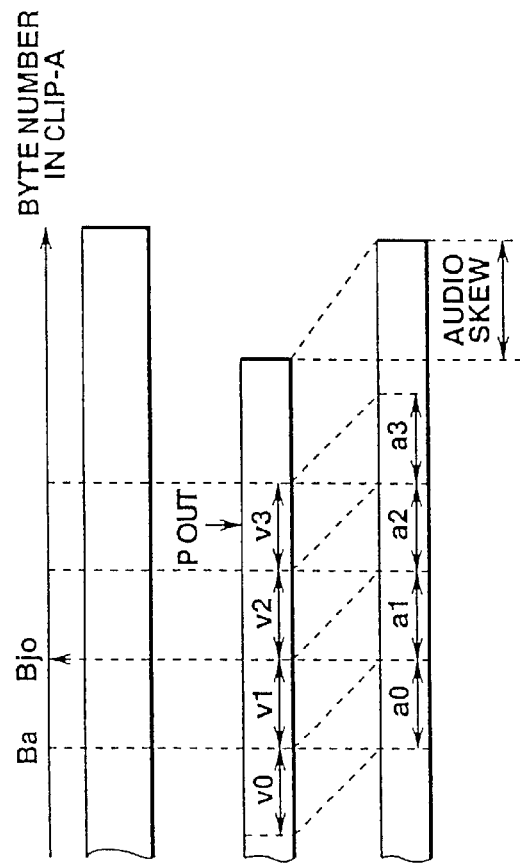
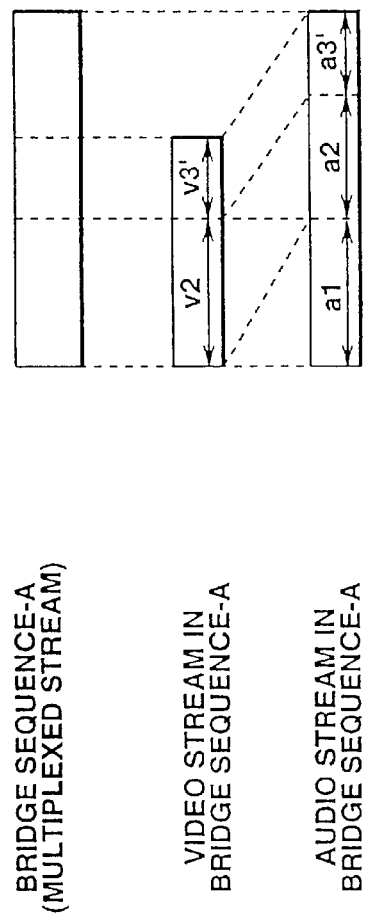
FIG.3A
FIG.3B

MULTIPLEXING METHOD FOR CONTINUOUS REPRODUCTION OF ENCODED PICTURES DURING SKIPPING

BACKGROUND OF THE INVENTION

The present invention relates to a multiplexer, multiplexing method and a recording medium for a video coded stream.

Generally, a recording and reproducing apparatus such as an optical disc drive comprises an encoder and decoder for compression and expansion (or decompression) based on the Moving Pictures Experts Group (the "MPEG") standard. The apparatus records and reproduces a video signal through the MPEG-based image compression or expansion.

In the MPEG method, pictures (frames or fields) composing together a moving image are coded into any of types: I-picture, P-picture and B-picture in order to compress the image.

The I picture is an "intra-coded picture". It is produced by spacial coding within a picture without reference to other pictures. Therefore, the I picture is used as a random-access entry point or for recovery from an error.

The P picture is a "predictive-coded picture". It is produced by coding through prediction from a previous I or P picture. Therefore, to decode a P picture, the past I or P picture must be decoded.

The B picture is a "bidirectionally predictive-coded picture". It is produced by coding through forward, backward or bidirectional prediction from a previous I or P picture and a later I or P picture. Therefore, to decode a B picture, the previous and later I or P pictures must be decoded.

Thus, the MPEG method enables efficient compression of a moving image by inter-picture predictive coding and random access to a compressed moving image.

Also, the MPEG method compresses a moving image into a data stream formed from data in units of Group of Pictures ("GOP"), each GOP containing an arbitrary number of I, P and B pictures. It is prescribed in the MPEG method that a GOP should include at least an I picture. Therefore, random access can be made to a moving image compressed in units of GOP.

Here, it will be discussed how the aforementioned recording and reproducing apparatus reproduces an image signal compressed by the MPEG method.

It is assumed, for example, that the recording and reproducing apparatus uses a recording medium having recorded thereon a stream of coded data as shown in FIG. 10A. The recording and reproducing apparatus decodes the data stream recorded as shown in FIG. 10A and displays pictures in the data stream in an order shown in FIG. 10B. The symbols I, P and B added to the pictures indicate an I picture, P picture and B picture, respectively. Each of the symbols has a suffix which is a so-called temporal reference indicative of the order of each picture in the GOP.

To reproduce coded data in the data stream shown in FIG. 10A, first, a picture $I_0$ is decoded. Since an I picture is produced by spacial coding within a picture without reference to other pictures, as mentioned above, the picture $I_0$ can be decoded individually without decoding other pictures. Next, a picture $P_2$ produced by forward predictive coding is decoded based on decoded picture $I_0$. Since a P picture is produced by coding through prediction from a previous I or P picture, picture $I_0$ must be decoded before picture $P_2$ is decoded. Then, a picture $B_1$ produced by bidirectional prediction coding is decoded based on decoded pictures $I_0$ and $P_2$. Since a B picture is produced by coding through bidirectional prediction from a previous I or P picture and a later I or P picture, pictures $I_0$ and $P_2$ must be decoded before picture $B_1$ is decoded. In this way, the coded data in the data stream shown in FIG. 10A is decoded in the order of $I_0 \rightarrow P_2 \rightarrow B_1 \rightarrow P_4 \rightarrow B_3 \rightarrow P_6 \rightarrow B_5 \rightarrow I_8 \rightarrow B_7 \rightarrow P_{10} \rightarrow B_9 \rightarrow \ldots$ To display each of these decoded pictures, their decoded order is changed to $I_0 \rightarrow B_1 \rightarrow P_2 \rightarrow B_3 \rightarrow P_4 \rightarrow B_5 \rightarrow P_6 \rightarrow B_7 \rightarrow I_8 \rightarrow B_9 \rightarrow P_{10} \rightarrow \ldots$ as shown in FIG. 10B.

If the recording medium is random-accessible, coded data recorded by the MPEG method can be random-accessed. Therefore, previously, pictures down to a P picture at point $S_A$ in a stream shown in FIG. 11 for example may be reproduced, subsequent pictures may be left not reproduced down to a picture just before a B picture at point $S_B$ (picture B3), and the picture B3 and subsequent pictures may be reproduced. That is, a stream can be reproduced with some of the pictures in the stream left not reproduced. Leaving some pictures not reproduced will be referred to as "skipping" hereinafter, and reproducing a stream while skipping some pictures will be referred to as "skipping reproduction" hereinafter. Also, a picture just before the skipping is started (the picture at point $S_A$ in FIG. 11, for example) will be referred to as an "out-point picture" hereinafter, while a picture which is first reproduced after completion of the skipping (the picture at point $S_B$ shown in FIG. 11, for example) will be referred to as an "in-point picture" hereinafter.

In skipped reproduction, an image thus reproduced may be temporally discontinuous in some cases.

If an in-point picture is a B picture for example, an I or P picture necessary for decoding this B picture must be decoded. In this case, the reproduced B picture image may be temporally discontinuous if the necessary I or P picture is not decoded. This problem will be described in view of the example shown in FIG. 11. Since the in-point picture is a picture B3, at least pictures I0, P2 and P4 must be decoded to decode picture B3. Therefore, while pictures I0, P2 and P4 are being decoded, no pictures can be displayed. Thus, an image resulting from such a skipping reproduction would be temporally discontinuous. Consequently, if a skipping reproduction is effected, pictures before and after skipped pictures cannot be reproduced so as to be seamlessly contiguous to each other.

In the foregoing, image compression by the MPEG method has been described. In addition to the aforementioned methods of predictive coding, there is a method of inter-picture predictive coding based on the fact that two successive pictures in a stream have a correlation between them. In the inter-picture predictive coding, a difference between the two pictures is determined and coded. Even by this method, an image resulting from a skipping reproduction may be temporally discontinuous.

OBJECTS AND SUMMARY OF THE INVENTION

Accordingly, it is an object of the present invention to overcome the above-mentioned drawbacks by providing a multiplexing technique for coding a moving image with skip over pictures in the image from one skipping point to the next, so that the coded image can be reproduced with no temporal discontinuity between the skipping points.

It is another object of the invention to provide a multiplexing technique for coding a moving image such that a video buffer of a moving image decoder does not overflow or underflow during reproduction of the coded image.

The above objects can be attained by encoding a first video coded stream of which the display ends with a first picture and a second video coded stream of which the display begins with a second picture which is displayed following the first picture during skipping reproduction. The first video coded stream and an audio coded stream synchronous with the first video coded stream are packed to generate a first multiplexed stream, and the second video coded stream and an audio coded stream synchronous with the second video coded stream are packed to generate a second multiplexed stream. The first and second video coded streams are encoded in such a manner that for a period from the time at which the second video coded stream starts being supplied to a video buffer of a decoder until the time at which the decoding of the last coded picture in the first video coded stream ends, the bit occupancy in the video buffer is smaller than the capacity of the video buffer and larger than zero.

BRIEF DESCRIPTION OF THE DRAWING

The present invention will best be understood from the following detailed description, taken in conjunction with the accompanying drawings, wherein:

FIGS. 3A and 3B show a multiplexed stream of an out-point program to be re-multiplexed and a bridge sequence produced by the re-multiplexing;

DETAILED DESCRIPTION OF THE PREFERRED EMBODIMENT

A moving image recording and reproducing apparatus according to an embodiment of the present invention will further be described below with reference to the accompanying drawings.

Figure 1:
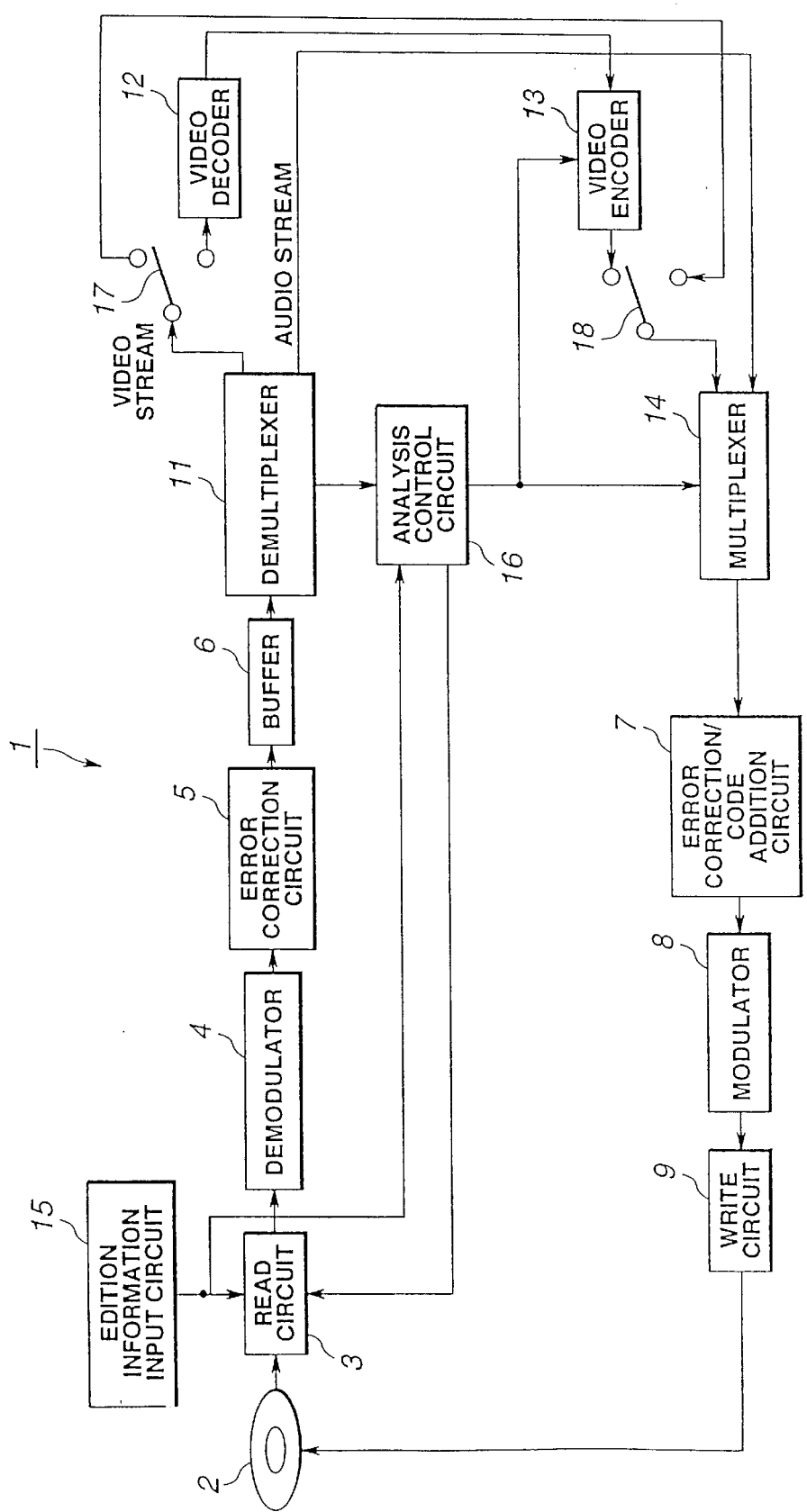
FIG. 1 is a block diagram of the moving image recording and reproducing apparatus according to the present invention.

FIG. 1 is a schematic block diagram of a moving image recording and reproducing apparatus according to the present invention.

A moving image recording and reproducing apparatus (referred to simply as "apparatus" hereinafter) 1 edits a moving image encoded through compression by the MPEG-2 method and recorded on a record medium, such as an optical disc 2, to generate a moving image with seamless skipping reproduction for a decoder, and then records the generated moving image onto medium 2 again.

Note that the following description of apparatus 1 is based on the assumption that medium 2 has recorded thereon streams of video data and audio data time-division multiplexed in units of packs of video data and audio data encoded by the MPEG-2 method. A moving image program including an out-point picture in a skipping reproduction will be referred to as an "out-point side program" hereinafter while a moving image program including an in-point picture will be referred to as an "in-point side program". Also, a GOP including an out-point picture will be referred to as an "out-point side GOP" hereinafter, while a GOP including an in-point picture will be referred to as an "in-point side GOP".

Apparatus 1 comprises a read circuit 3 to read a multiplexed stream from medium 2, a demodulator 4 to demodulate the multiplexed stream read from medium 2, an error correction circuit 5 for performing error correction on the multiplexed stream demodulated by demodulator 4, a buffer 6 to temporarily store the multiplexed stream error-corrected by an error correction circuit 5, an error correction code addition circuit 7 to add an error correction code to the error corrected multiplexed stream, a modulator 8 to modulate the multiplexed stream having the error correction code added thereto by error correction code addition circuit 7, and a write circuit 9 to write the multiplexed stream modulated by modulator 8 onto medium 2.

In addition, apparatus 1 comprises a demultiplexer 11 to separate a multiplexed stream stored in buffer 6 into video and audio streams, a video decoder 12 to decode the video stream separated by demultiplexer 11 to generate image data, a video encoder 13 to re-encode the image data decoded by video decoder 12 to generate a video stream, and a multiplexer 14 for time-division multiplexing the video and audio streams to generate a multiplexed stream.

Further, apparatus 1 comprises an edit information input circuit 15 to supply read circuit 3 with edit information required for skipping reproduction of in-point picture information and out-point picture information.

Apparatus 1 further comprises an analysis controller 16 to control video decoder 12, video encoder 13, and multiplexer 14 by analyzing edit information supplied from edit information input circuit 15 and the multiplexed stream supplied from demultiplexer 11, and determining the edit method (re-encoding and re-multiplexing of video stream) necessary for seamless skipping reproduction by video decoder 12.

Moreover, apparatus 1 comprises a first selector 17 to select a destination to which a video stream separated by demultiplexer 11 is to be sent, and a second selector 18 to select a source from which the video stream is to be supplied to multiplexer 14. Under control of analysis controller 16, first and second selectors. 17 and 18 select either a mode in which the video stream separated by demultiplexer 11 is decoded and re-encoded by video decoder 12 and video encoder 13 before it is supplied to multiplexer 14, or a mode in which the video stream separated by demultiplexer 11 is supplied as is to multiplexer 14 without being decoded and re-encoded. Similarly, (although not shown) the selectors determine whether the audio stream separated by demultiplexer 11 is supplied as is to multiplexer 14 without being decoded and re-encoded.

In apparatus 1 constructed as described above, analysis controller 16 analyzes a multiplexed stream reproduced from medium 2 to control read circuit 3, video decoder 12, video encoder 13, multiplexer 14, and first and second selectors 17 and 18, thereby generating a bridge sequence (which will be described in further detail below) for a seamless skipping reproduction by decoder 12 and recording the bridge sequence onto the optical disc 2.

Next, re-encoding of a video stream by apparatus 1 will be described hereinbelow.

In apparatus 1, during skipping reproduction in which a part of a moving image program in decoder 12 is skipped, the video stream is re-encoded for seamless connection between an out-point side program, being a program before an out-point picture at which the skipping reproduction is started, and an in-point side program after an in-point picture at which the skipping reproduction is ended.

A GOP prescribed in the MPEG-2 standard as a unit of pictures contains three kinds of coded pictures, including: at least one I picture which is the "intra-coded picture" produced by spacial coding within a picture without reference to other pictures and which is used as a reference picture; a P picture which is the "predictive-coded picture" produced by coding through prediction from a previous I or P picture; and a B picture which is the "bidirectionally predictive-coded picture" produced by coding through forward and backward or bidirectional prediction from a previous I or P picture and a later I or P picture.

Figures 2A, 2B, 2C, 2D:
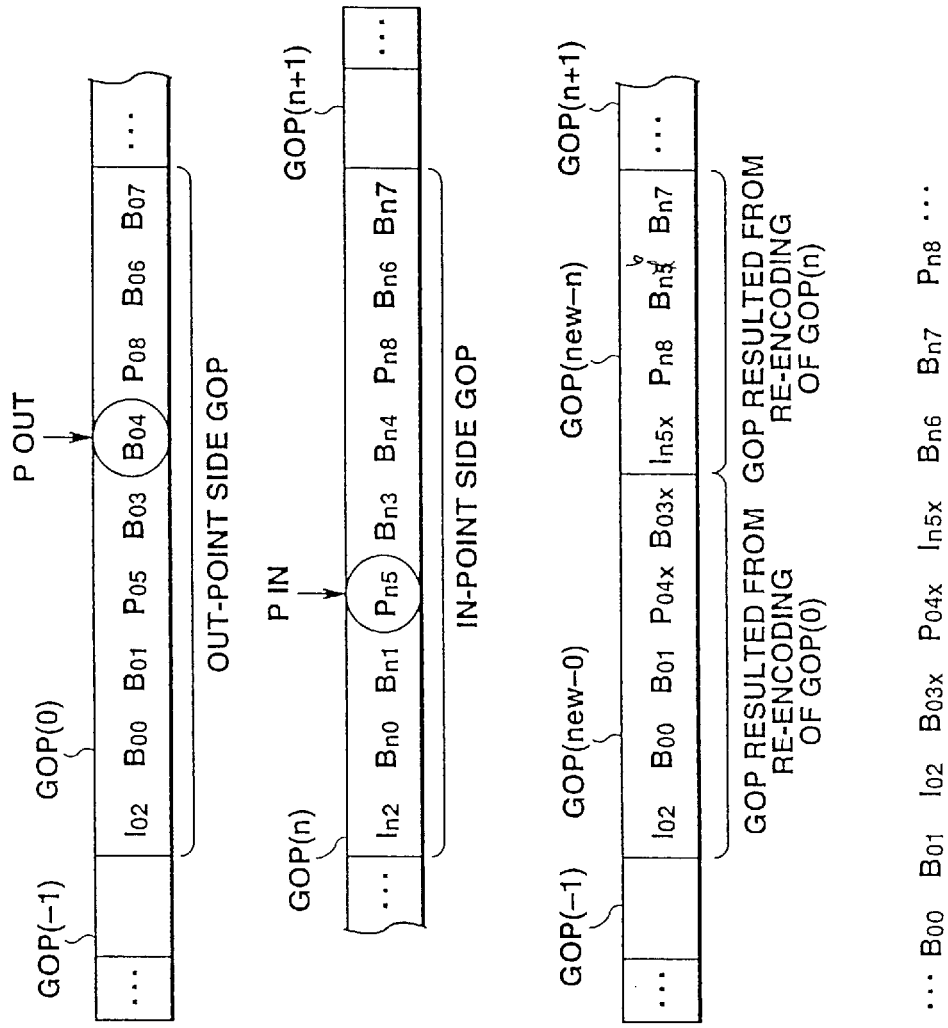
FIGS. 2A, 2B, 2C and 2D show a video stream to be re-encoded and a video stream having been re-encoded, by the moving image recording and reproducing apparatus shown in FIG. 1.

It is assumed that an out-point side GOP including out-point picture P OUT is taken as GOP(0), and out-point picture P OUT is $B_{04}$, which is a B picture in GOP(0), as shown in FIG. 2A. GOP(0) is a GOP following GOP(−1). Also, it is assumed that an in-point side GOP, including in-point picture P IN is taken as GOP(n) and the in-point picture P IN is $P_{n5}$, which is a P picture in GOP(n) as shown in FIG. 2B. GOP(n) is followed by GOP(n+1). A GOP which is displayed at an i-th place is indicated as GOP(i). Also, an I picture displayed at a j-th place (namely, the temporal reference is j) in GOP(i) is indicated as $I_{ij}$, a P picture displayed at a j-th place in the GOP(i) is indicated as $P_{ij}$, and a B picture displayed at a j-th place in GOP(i) is indicated as $B_{ij}$.

More particularly, GOP(0) is the out-point side GOP containing pictures $I_{02}$, $B_{00}$, $B_{01}$, $P_{05}$, $B_{03}$, $B_{04}$, $P_{08}$, $B_{06}$ and $B_{07}$ arranged in this order. GOP(n) is the in-point side GOP containing pictures $I_{n2}$, $B_{n0}$, $B_{n1}$, $P_{n5}$, $B_{n3}$, $B_{n4}$, $P_{n8}$, $B_{n6}$, and $B_{n7}$ arranged in this order.

In apparatus 1, the re-encoding is effected, as will be described hereinbelow using a program shown in FIGS. 2A and 2B as an example:

First, GOP(0) being the out-point side GOP containing out-point picture P OUT is decoded. Then, GOP(0) is re-encoded so that out-point picture P OUT can be decoded without reference to a coded picture later in a displayed order than out-point picture P OUT. For example, if picture $B_{04}$ in GOP(0) being the out-point side GOP is out-point picture P OUT as shown in FIG. 2A, pictures $B_{03}$ and $B_{04}$ coded through prediction from picture $P_{05}$ are re-encoded so that they can be produced without reference to picture $P_{05}$, to generate GOP(new-0) as a new GOP. More specifically, to generate GOP(new-0), first pictures $I_{02}$, $B_{00}$, $B_{01}$, $P_{05}$, $B_{03}$ and $B_{04}$ are decoded back to non-compressed picture data, then picture $B_{04}$ is re-encoded to a P picture ($P_{04x}$) coded by prediction from picture $I_{02}$. Next, picture $B_{03}$ is re-encoded to a B picture ($B_{03x}$) coded through prediction from pictures $I_{02}$ and $P_{04x}$. Pictures $I_{02}$, $B_{00}$ and $B_{01}$ are copied from GOP(0) without re-encoding. Note that pictures $I_{02}$, $B_{00}$ and $B_{01}$ may be re-encoded. As a result of this re-encoding, GOP(new-0) consisting of pictures $I_{02}$, $B_{00}$, $B_{01}$, $P_{04x}$ and $B_{03x}$ as shown in FIG. 2(C) is generated.

Next, GOP(n), being the in-point side GOP containing in-point picture P IN is decoded. GOP(n) then is re-encoded so that in-point picture P IN can subsequently be decoded without reference to a coded picture earlier in the display order than in-point picture P IN. That is, if picture $P_{n5}$ in GOP(n), being the in-point side GOP as shown in FIG. 2B, is in-point picture P IN, picture $P_{n5}$ coded through prediction from picture $I_{n2}$ is re-encoded so that it can subsequently be produced without reference to picture $I_{n2}$, to generate GOP (new-n) as a new GOP. More specifically, to generate new GOP(new-n), first pictures $I_{n2}$, $B_{n0}$, $B_{n1}$, and $P_{n5}$ are decoded back to non-compressed picture data, and then picture $P_{n5}$ is re-encoded to picture $I_{n5x}$, which can independently be decoded. Pictures $P_{n8}$, $B_{n6}$ and $B_{n7}$ are copied from GOP(n) without re-encoding. Note that pictures $P_{n8}$, $B_{n6}$ and $B_{n7}$ may be re-encoded. As a result of this re-encoding, GOP(new-n) consisting of pictures $I_{n5x}$, $P_{n8}$, $B_{n6}$ and $B_{n7}$ as shown in FIG. 2C is generated. Pictures $B_{n3}$ and $B_{n4}$ are discarded from GOP(new-n) because they are skipped during the skipping reproduction operation.

In apparatus 1, the in-point and out-point side GOPs are re-encoded under the control of analysis controller 16, which controls video decoder 12, video encoder 13, and first and second selectors 17 and 18. Further, in apparatus 1, pictures ( . . . , $I_{02}$, $B_{00}$, $B_{01}$, $B_{03}$ and $B_{04}$) earlier in displayed order than out-point picture $B_{04}$ and pictures ($P_{n5}$, $P_{n8}$, $B_{n6}$, $B_{n7}$, . . . ) later in displayed order than in-point picture $P_{n5}$ can be re-encoded to generate a moving image displayed in the order of . . . , $B_{00}$, $B_{01}$, $I_{02}$, $B_{03x}$, $P_{04x}$, $I_{n5x}$, $B_{n6}$, $B_{n7}$, $P_{n8}$, . . . , as shown in FIG. 2D. Hence, appararatus 1 can reproduce a moving image before the in-point picture and a moving image after the out-point picture, which follows the former image with no seam between them.

Next, re-multiplexing a multiplexed stream in apparatus 1 will be described hereinbelow.

In apparatus 1, to realize the skipping of a part of a moving image program in the decoder, a multiplexed stream is re-multiplexed for seamless connection between an out-point side program earlier in time than the out-point picture, at which the skipping reproduction is started, and an in-point side program later in time than the in-point picture, at which the skipping reproduction is ended.

FIG. 3A shows a sample configuration of a multiplexed stream of an out-point side program. Reference Clip-A indicates a multiplexed stream containing the out-point side program. It is for example, a program stream having added thereto a series of System Clock Reference ("SCR") codes defined in the MPEG-2 standard (ISO/IEC 13818-1). Clip-A has a video stream and an audio stream time-division multiplexed therein in packs. In FIG. 3A, references v0, v1, v2 and v3 indicate video streams, respectively, each having a GOP length; and references a0, a1, a2 and a3 indicate audio streams, respectively, each having a GOP length. Video stream v1 and audio stream a0 are time-division multiplexed in packs between byte positions Ba and Bjo, for example, in Clip-A. In the illustrative embodiment, the size of one pack is 2048 bytes.

In Clip-A, audio streams are arranged at byte positions displaced by an audio skew (A–V phase difference) of predetermined bytes in relation to a video stream synchronously reproduced. In the example shown in FIG. 3A, the audio skew is a fixed value, but it may be variable in a program stream. In this embodiment, streams v0 and a0 are synchronous with each other, and similarly, streams v1 and a1, v2 and a2, and v3 and a3 are synchronous with each other, respectively.

Assuming here that out-point picture P OUT in the GOP of v3 in Clip-A is selected, apparatus 1 generates a bridge sequence on the out-point side in a procedure that will be described below. The bridge sequence is a multiplexed stream in which video streams generated by re-encoding video streams near an edit point are re-multiplexed.

Firstly, the GOP of v3 containing the out-point picture is re-encoded based on the aforementioned re-encoding of video stream. In this case, the GOP of v3 is re-encoded to newly generate GOP of v3'. The time length of v3' is shorter than that of v3.

Secondly, with byte position Bjo taken as a jump point from Clip-A on the out-point side to bridge sequence-A, a video stream (v2 in this case) existing at a later byte position than byte position Bjo, but before video stream v3, is copied from Clip-A. Also, audio streams (a1 and a2 in this case) existing at a later byte position than Bjo, but before an audio stream synchronous with video stream v3' are copied from Clip-A. Further, an audio stream synchronous with video stream v3' is copied from audio stream a3 to generate audio stream a3'.

Thirdly, the video and audio streams generated by the aforementioned first and second steps of re-encoding are re-multiplexed. In this case, streams v2 and v3' and a1, a2 and a3' are re-multiplexed to generate bridge sequence-A shown in FIG. 3B. Bridge sequence-A is recorded onto the optical disc 2.

To read optical disc 2 having bridge sequence-A recorded thereon for the purpose of a skipping reproduction in decoder 12, Clip-A is read down to byte point Bjo and then bridge sequence-A is read in order to reproduce the multiplexed stream at the out-point side.

It is noted that apparatus 1 has to multiplex streams existing between Clip-A down to byte point Bjo and bridge sequence-A to be a program stream having a series of SCR codes added thereto.

Figure 4A:
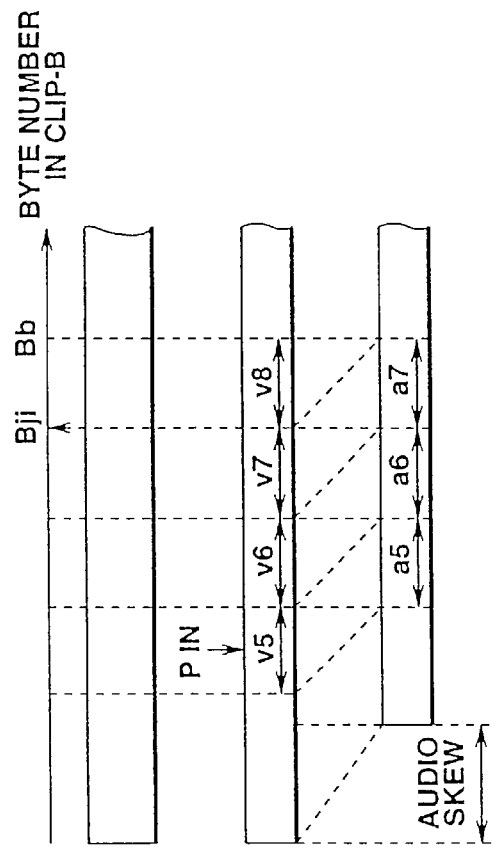
FIGS. 4A and 4B show a multiplexed stream of an in-point program to be re-multiplexed and a bridge sequence produced by the re-multiplexing.

FIG. 4A shows a sample configuration of a multiplexed stream of an in-point side program. Reference Clip-B indicates a multiplexed stream containing the in-point side program. It is, for example, a program stream having added thereto a series of SCR codes defined in the MPEG-2 standard. Clip-B has a video stream and an audio stream time-division multiplexed therein in packs. In FIG. 4A, references v5, v6 and v7 indicate video streams, respectively, each having a GOP length; and references a6, a7 and a8 indicate audio streams, respectively, each having a GOP length. Video stream v8 and audio stream a7 are time-division multiplexed in packs between byte positions Bji and Bb, for example, in Clip-B. In Clip-B, audio streams are arranged at byte positions displaced by an audio skew (A–V phase difference) of predetermined bytes in relation to a video stream synchronously reproduced. Also, in the example shown in FIG. 4A, the audio skew is a fixed value, but it may be variable in a program stream. In this embodiment, streams v5 and a5 are synchronous with each other, and, similarly, streams v6 and a6, v7 and a7, and v8 and a8 are synchronous with each other, respectively.

Assuming here that in-point picture P IN in the GOP of v5 in Clip-B is selected, apparatus 1 generates a bridge sequence on the in-point side in a procedure that will be described below.

Firstly, the GOP of v5 containing the in-point picture is re-encoded based on the aforementioned re-encoding of video stream. In this case, the GOP of v5 is re-encoded to newly generate GOP of v5'. The time length of v5' is shorter than that of v5.

Secondly, with byte position Bji taken as a jump point to Clip-B on the in-point side from bridge sequence-B, video streams (v6 and v7 in this case), being a later video pack than v5 and existing also before byte position Bji, are copied from Clip-B. Also, a later audio stream (a6 in this case) later than an audio stream synchronous with v5' and existing at a byte position before byte position Bji, is copied from Clip-B. Further, an audio stream synchronous with video stream v5' is copied from audio stream a5 to generate audio stream a5'.

Thirdly, the video and audio streams generated by the aforementioned first and second steps of re-encoding are re-multiplexed. In this case, streams v5', v6 and v7, and a5' and a6 are re-multiplexed to generate bridge sequence-B shown in FIG. 4B. Bridge sequence-B is recorded onto the optical disc 2.

To read optical disc 2 having bridge sequence-B recorded thereon for a skipping reproduction in decoder 12, bridge sequence B is read during reproduction of the in-point side program and then Clip-B is read from byte position Bji.

It is noted that apparatus 1 has to multiplex streams existing between bridge sequence-B and Clip-B after byte position Bji to be a program stream having a series of SCR codes added thereto.

Figure 4B:
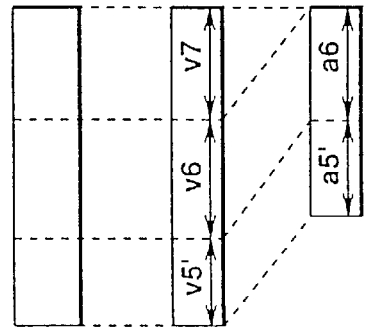

Through the aforementioned re-multiplexing, apparatus 1 can generate bridge sequence-A shown in FIG. 3B and bridge sequence-B shown in FIG. 4B.

Figure 5:
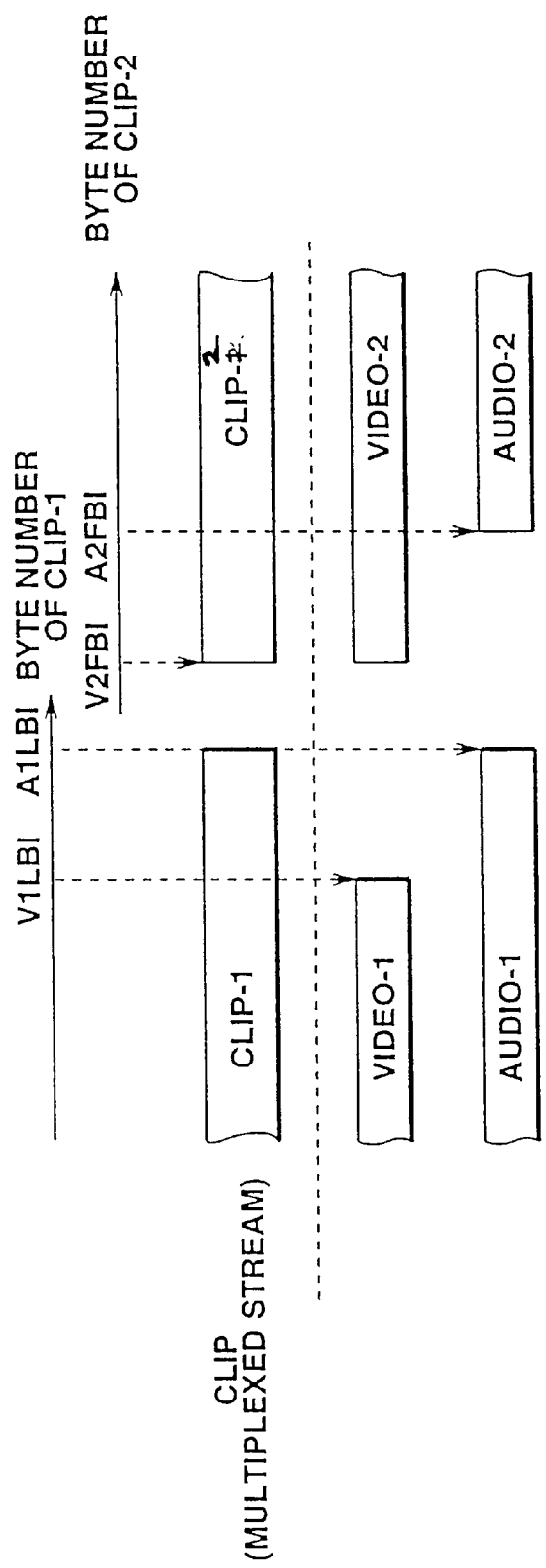
FIG. 5 shows the configurations of multiplexed streams before and after the edit point of an out-point program and an in-point program.

FIG. 5 shows the configuration of the multiplexed stream before and after the edit point when the multiplexed stream between Clip-A before byte position Bji and bridge sequence-A is taken as Clip-1; while the multiplexed stream between bridge sequence-B and Clip-B after byte position Bji is taken as Clip-2. In decoder 12, it is necessary to display video and audio streams with no blank between them when the multiplexed streams between Clip-1 and Clip-2 are continuously decoded. For seamless reproduction of video and audio streams in decoder 12 of apparatus 1, encoding and multiplexing are effected with the audio streams in Clip-1 and Clip-2 being limited as described below.

There should not be a gap in audio display time between the end of Clip-1 and beginning of Clip-2. That is, audio streams in Clip-1 are re-multiplexed to contain an audio sample, which is displayed at a time when the display of video streams in Clip-1 ends, and audio streams in Clip-2 are re-multiplexed to contain an audio sample, which is displayed at a time when the display of video streams in Clip-2 starts. Therefore, at the boundary between the end of Clip-1 and beginning of Clip-2 there may be an overlap of a display time of 2 or less audio frames. For example, one audio frame is an audio stream whose display time is 24 msec if it is an audio stream covered by the MPEG-1 standard.

The positions V1LBI, A1LBI, V2FBI and A2FBI shown in FIG. 5 are as follows:

V1LBI: Last byte position of last pack of video-1 in Clip-1

A1LBI: Last byte position of last pack of audio-1 in Clip-1

V2FBI: First byte position of first pack of video-2 in Clip-2

A2FBI: First byte position of first pack of audio-2 in Clip-2

These byte positions have the following relations between them:

V1LBI<A1LBI

V2FBI<A2FBI

It is noted that relations other than the above are possible in the MPEG standard, but seldom exist in practice.

Figure 6:
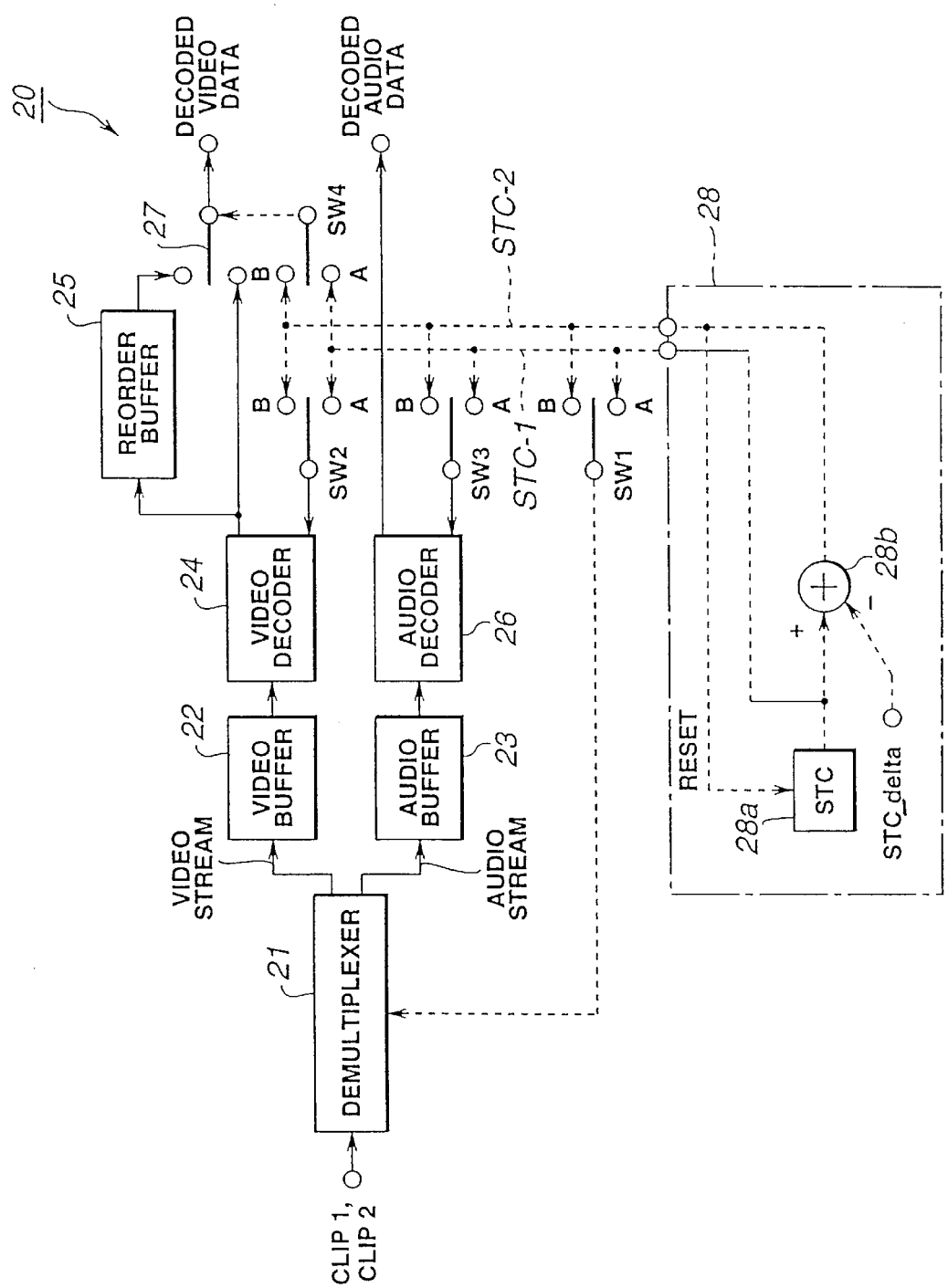
FIG. 6 is a block diagram of a system target decoder which decodes a multiplexed steam produced by the moving image recording and reproducing apparatus shown in FIG. 1.

FIG. 6 shows a block diagram of a system target decoder that is a virtual decoder model for reproduction of Clip-1 and Clip-2 generated by apparatus 1. The skipping reproduction in the system target decoder will be described below with reference to FIG. 6.

As shown in FIG. 6, a system target decoder 20 comprises a demultiplexer 21 supplied with a multiplexed stream (Clip-1 and Clip-2) read from optical disc 2 to demultiplex the multiplexed stream into a video stream and an audio stream, a video buffer 22 to temporarily store the video stream separated by demultiplexer 21, an audio buffer 23 to temporarily store the audio stream separated by demultiplexer 21, a video decoder 24 to extract and decode the video stream stored in video buffer 22; a reorder buffer 25 to temporarily store the decoded image data; an audio decoder 26 to extract and decode the audio stream stored in audio buffer 23; and an output switch 27 to select the image data decoded by video decoder 24 or the image stored in reorder buffer 25 for delivery.

System target decoder 20 further comprises a time controller 28 to provide a System Time Clock ("STC") for the changeover timing of demultiplexer 21, decoding timing of video decoder 24, decoding timing and output timing of audio decoder 26, and output timing of output switch 27.

Also, system target decoder 20 comprises first to fourth STC switches SW1 to SW4 to select SCR codes supplied from time controller 28.

Demultiplexer 21 is supplied with packets that form the multiplexed stream according to the SCR codes added to the multiplexed stream. Demultiplexer 21 demultiplexes the multiplexed stream into video and audio streams based on the STC supplied from time controller 28.

Video decoder 24 extracts and decodes data of a predetermined picture from video buffer 22 when there is a coincidence between the Decoding Time Stamp ("DTS") added to the video stream and the STC supplied from time controller 28. The decoded image data is delivered as output via output switch 27 directly from video decoder 24 or it is stored into reorder buffer 25 once and then provided as output via output switch 27.

Audio decoder 26 decodes the audio stream to provide decoded audio data when the Presentation Time Stamp ("PTS") added to the audio stream coincides with the STC supplied from time controller 28.

It is noted that the additional buffer size of audio buffer 23 provided upstream of audio decoder 26 should be as follows in comparison with the one prescribed in the MPEG-2 standard (CSPS=1):

$$\text{additional\_buffer\_size}=(\text{program\_mux\_rate}\_Ra)\times Ra/\text{program\_mux\_rate} \quad (1)$$

where "Ra" is a maximum bit rate of the audio stream and "program_mux_rate" is a larger one of the maximum bit rates of the program streams in Clip-1 and Clip-2. When program_mux_rate=10 Mpbs and Ra=256 kbps, for example, the additional buffer size of audio buffer 23 will be 0.249 Mbits.

Output switch 27 delivers a decoded video data when the PTS added to the video stream coincides with STC supplied from time controller 28. Note that output switch 27 provides video data stored in reorder buffer 25 as necessary.

Time controller 28 generates two kinds of STC: one is synchronous with the SCR of an out-point side program, and another is synchronous with the SCR of an in-point side program, when the out-point side program is switched to the in-point side program during skipping reproduction.

Time controller 28 comprises, for example, an STC generator 28a to generate an STC and a subtractor 28b to subtract a predetermined offset value (STC_delta) from the STC generated by STC generator 28a. Thus, time controller 28 provides the two STCs: an STC which is provided directly from STC generator 28a and from which the offset value is not subtracted (which is synchronous with the SCR for the out-point side program and will be referred to as "STC-1" hereinafter) and STC resulting from subtraction of the offset value (STC_delta) from STC-1 provided directly from STC generator 28a (which is an STC synchronous with SCR of the in-point side program and will be referred to as "STC-2" hereinafter).

That is to say, the offset value (STC_delta) indicates an offset value in time base of the multiplexed stream between Clip-1 and Clip-2. It is a difference between a time on the time base at which display of video stream in Clip-1 is ended and a time on the time base at which display of video stream in Clip-2 is started.

Assuming that the PTS of the out-point picture P OUT on the time base of Clip-1 is PTS_P OUT, period for which out-point picture P OUT is displayed as Tpp and the PTS of in-point picture P IN on the time base of Clip-2 is PTS_P IN. Then, the offset value (STC_delta) is as expressed below:

$$PTS\_POUT\_end=PTS\_POUT+Tpp \quad (2)$$

$$STC\_\text{delta}=PTS\_POUT\_end-PTS\_PIN \quad (3)$$

Either of the STCs (STC-1 and STC-2) provided from time controller 28 is selected by first to fourth STC switches SW1 to SW4, and supplied to demultiplexer 21, video decoder 24, audio decoder 26, and output switch 27. First STC switch SW1 is supplied at terminal A thereof with STC-1 and at terminal B thereof with STC-2. Either terminal is selected and STC-1 or STC-2 supplied at the selected terminal is supplied to demultiplexer 21. Second STC switch SW2 is supplied at terminal A thereof with STC-1, and at terminal B thereof with STC-2. Either terminal is selected and STC-1 or STC-2 supplied at the selected terminal is supplied to video decoder 24. Third STC switch SW3 is supplied at terminal A thereof with STC-1, and at terminal B thereof with STC-2. Either terminal is selected and STC-1 or STC-2 supplied at the selected terminal is supplied to audio decoder 26. Fourth STC switch SW4 is supplied at a terminal A thereof with STC-1 and at terminal B thereof with STC-2. Either terminal is selected and STC-1 or STC-2 supplied at the selected terminal is supplied to output switch 27.

Next, functions of system target decoder 20 constructed as described above will be described hereinbelow.

Figure 7:
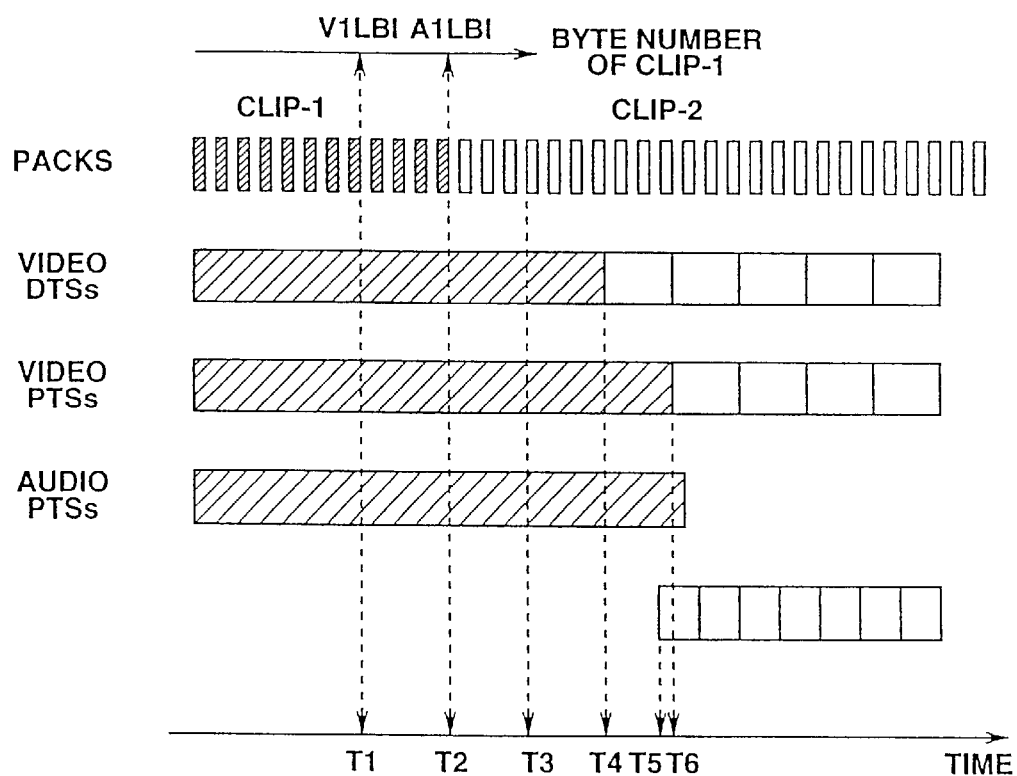
FIG. 7 is a functional time chart of the operations of the system target decoder when a multiplexed stream produced by the moving image recording and reproducing apparatus shown in FIG. 1 is supplied to the system target decoder.

FIG. 7 is a timing chart illustrating operations of system target decoder 20 when two successive multiplexed streams Clip-1 and Clip-2 are supplied.

First, the SCR for the first pack in Clip-1 is set as the STC in STC generator 28a. All first to fourth STC switches SW1 to SW4 are closed to their respective terminals A to supply STC-1 (synchronous with the SCR of Clip-1) to demultiplexer 21, video decoder 24, audio decoder 26, and output switch 27. That is, all the functions are in action based on the SCR added to Clip-1.

Before time T1, demultiplexer 21 is supplied with the STC when the SCR added to each pack in Clip-1 coincides with STC-1 to which an offset value supplied from terminal A of first STC switch SW1 is not added.

Then at time T1, supply of a last video pack of Clip-1 to demultiplexer 21 is ended.

For a period from time T1 to time T2, demultiplexer 21 is supplied with video packs in Clip-1 at the maximum bit rate (program_mux_rate1) of Clip-1 with no regard to the SCR added to each pack. The maximum bit rate (program_mux_rate1) may be a maximum transfer rate at which data is read from medium 2.

It is assumed here that the data amount from a pack next to the last video pack in Clip-1 to the last pack is "N1". In this case, time "ΔT1" from time T1 to T2 is expressed as follows:

$$\Delta T1 = T2 - T1N1/\text{program\_mux\_rate 1} \quad (4)$$

Next, at time T2, supply of the last pack (audio pack) in Clip-1 to demultiplexer 21 is ended. At time T2, first STC switch SW1 is switched to terminal B and thus STC-2 (synchronous with SCR of Clip-2) is supplied to demultiplexer 21. Thus, demultiplexer 21 starts operating based on the SCR added to Clip-2.

For a period from time T2 to time T3, if the first pack in Clip-2 is not a video pack, demultiplexer 21 is supplied with packs, including from the first pack in Clip-2 up to one before the first video pack in Clip-2 at maximum bit rate (program_mux_rate2) of Clip-2, with no regard to the SCR of each pack. For example, the maximum bit rate (program_mux_rate 2) may be a maximum transfer rate at which data is read from medium 2.

It is assumed here that the data amount from a first pack in Clip-2 to a pack before the first video pack in Clip-2 is "N2". In this case, time "ΔT2" from time T2 to T3 is expressed as follows:

$$\Delta T2 = T3 - T2 = N2/\text{program\_mux\_rate2} \quad (5)$$

It is noted that ΔT2=0 because the first pack is generally a video pack in the program stream as prescribed in the MPEG-2 standard.

Next at time T3, supply of the first pack in Clip-2 to demultiplexer 21 is started. Subsequently, demultiplexer 21 is supplied with an STC when the SCR added to each pack in Clip-2 coincides with STC-1 to which an offset value supplied from terminal B of first STC switch SW1 is added.

The SCR added to the first video pack in Clip-2 should satisfy the following inequality:

$$SCR\_\text{video2\_start} > SCR\_\text{video1\_end} - STC\_\text{delta} + \Delta T1 + \Delta T2 \quad (6)$$

In expression (6) above, "SCR_video2_start" is an SCR for the first video pack in Clip-2, and "SCR_video1_end" is a time on the time base of Clip-1 at which supply of the last video pack in Clip-1 to demultiplexer 21 is ended. This is a value which can be calculated, as will be described below, from an SCR for the last video pack in Clip-1 (SCR_last_video1) and pack length. Illustratively, the pack length is 2048 bytes.

$$SCR\_\text{video1\_end} = SCR\_\text{last\_video1} + \text{pack\_length/program} \\ \text{mux\_rate1} \quad (7)$$

Next, at time T4, second STC switch SW2 is switched from terminal A to terminal B and the STC to which video decoder 24 refers is changed from STC-1 to STC-2. Since the STC added to each picture in the video stream and used for reference to the DTS is changed over, video decoder 24 starts decoding video streams in Clip-2.

Next, at time T5, third STC switch SW3 is shifted from terminal A to terminal B and the STC to which audio decoder 26 refers is changed from STC-1 to STC-2. Since the STC added to the audio stream for reference to the PTS is changed over, audio decoder 26 starts outputting audio streams in Clip-2. It is noted that there is an overlap between audio data in the end portion of Clip-1 and audio data in the beginning portion of Clip-2, audio decoder 26 has to select which audio data to display as sample, the data in Clip-1 or the data in Clip-2.

Next, at time T6, fourth STC switch SW4 is switched from terminal A to terminal B and the STC to which output switch 27 refers is changed from STC-1 to STC-2. Since the STC added to each picture in the video stream for reference to the PTS is changed over, output switch 27 starts outputting video streams in Clip-2.

At time T6, when all of first to fourth STC switches SW1 to SW4 are switched to their respective terminal B's, the STC value generated by STC generator 28a is reset to [STC-STC_delta] and thus all of first to fourth STC switches SW1 to SW4 are switched to their respective terminal A's so that the status before time T1 is restored.

Next, the rate control for a bridge sequence generated by re-encoding in apparatus 1, and limitations imposed upon the re-multiplexing of the bridge sequence will be described below.

Clip-1 and Clip-2 for recording onto medium 2 should be re-encoded and re-multiplexed so that both of them will be program streams which satisfy the operations of Program Stream System Target Decoder ("P-STD") defined in the MPEG-2 standard. Apparatus 1 re-encodes and re-multiplexes Clip-1 and Clip-2 under the following limitations.

Apparatus 1 re-encodes and re-multiplexes in such a manner that while decoding multiplexed streams continuously from Clip-1 to Clip-2, the video buffer of P-STD neither underflows nor overflows. In the case of system target decoder 20 having previously been described, for example, for supply of video packets in Clip-2 to video buffer 22 after supply of video packets in Clip-1, the time base is converted to one that is the same as the time base of Clip-2 to limit the time at which the video packets in Clip-2 are supplied to video buffer 22 in order to prevent video buffer 22 from overflowing and underflowing. The bridge sequence is then re-encoded and re-multiplexed.

The rate control for and limitation of re-multiplexing of a bridge sequence will be described in further detail with reference to an illustration of the bit occupancy in video buffer 22 in system target decoder 20.

Figure 8:
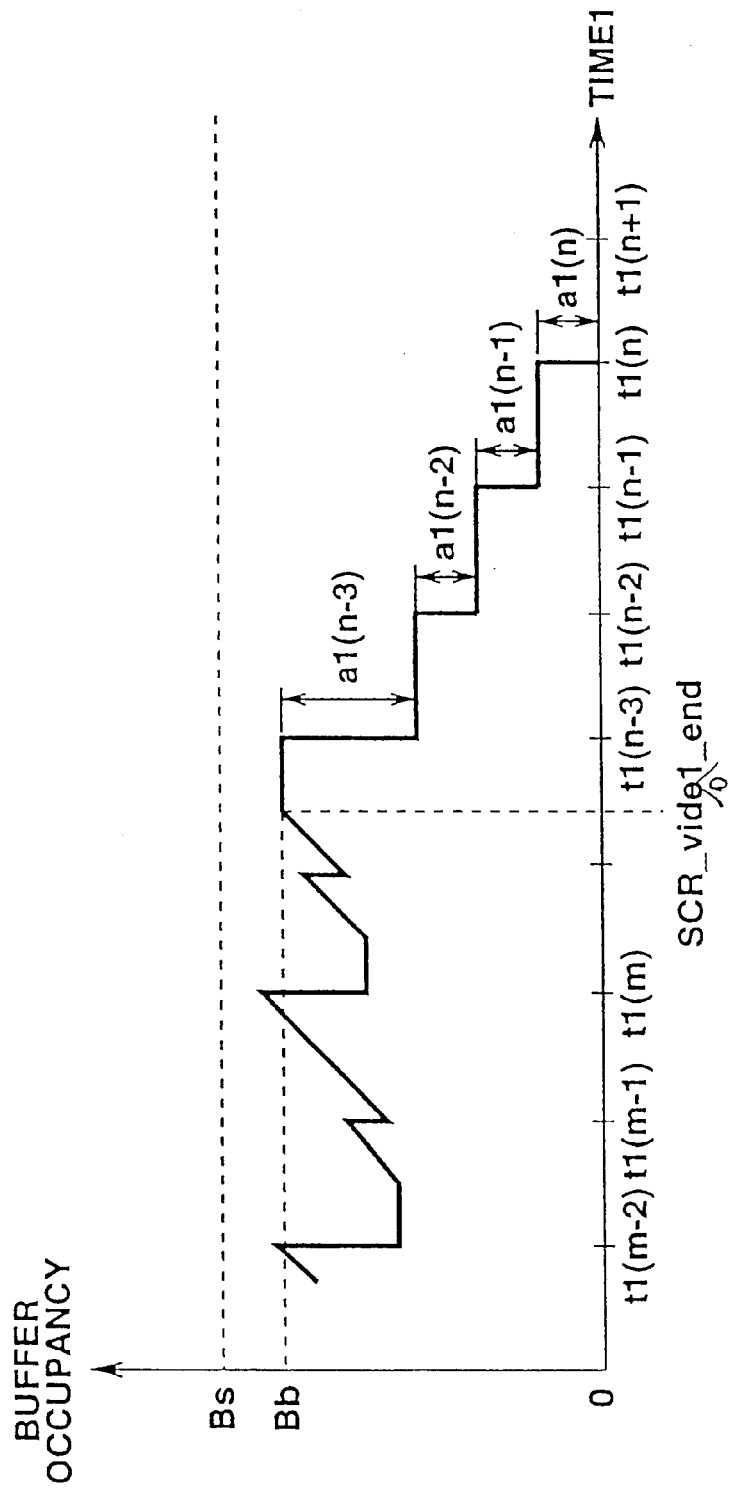
FIG. 8 illustrates the bit occupancy variation of a video buffer of the system target decoder when an out-point program is supplied to the video buffer.

FIG. 8 shows a change in bit occupancy of the multiplexed stream in Clip-1 in video buffer 22 in system target decoder 20. In FIG. 8, a time on the time base of Clip-1 is indicated along a horizontal axis "TIME1" and the bit occupancy in video buffer 22 is indicated along a vertical axis. The value of Bs is 232 kbytes, for example, as prescribed in the MPEG-2 standard (MP@ML).

In FIG. 8, "a1(i)" indicates a bit amount of an i-th coded picture in the decoded order for Clip-1. "t1(i)" indicates a time at which "a1(i)" is decoded and its value is added as a DTS in the bit stream. "a1(n)" indicates a bit amount of a last picture to be decoded in Clip-1, and "t1(n)" indicates a time at which "a1(n)" is decoded. The time zone in which the buffer occupancy ascends to the right indicates that data is supplied to video buffer 22 at the bit rate of Clip-1 (program_mux_rate1). The linear (horizontal) time zone with no gradient indicates that data supply to video buffer 22 is stopped.

At a time SCR_video1_end, supply to video buffer 22 of data of the last video pack (last video pack of bridge sequence-A shown in FIG. 3) in Clip-1 is ended. $B_b$ is the bit occupancy in video buffer 22 at time SCR_video1_end. After the time SCR_video1_end, data is only extracted from video buffer 22 at a DTS-determined time but no data is supplied to the data buffer while the bit occupancy is smaller.

At time t1(n+1), decoding of a1(n) is ended. Time t1(n+1) does not appear in the bit stream. Time (t1(n+1)−t1(n)) can be calculated as follows from picture_structure, picture_coding_type and repeat_first_field of a1(n), coded-I-frame just before a1(n) or prev_IP_repeat_first_field being repeat_first_field of code-P-frame:

```
if(picture_structure='frame_structure'){                    (8)
    if(a1(n)==B_picture){
        t1(n+1)−t1(n)=repeat_first_field+2[field period]
    }
    else{
        t1(n+1)−t1(n)=prev_IP_repeat_first_field+2[field period]
    }
}
else{
    if(a1(n)==B_picture){
        t1(n+1)−t1(n)=1[field period]
    }
    else{
        t1(n+1)−t1(n)=prev_IP_repeat_first_field+1[field period]
    }
}
```

Figure 9:
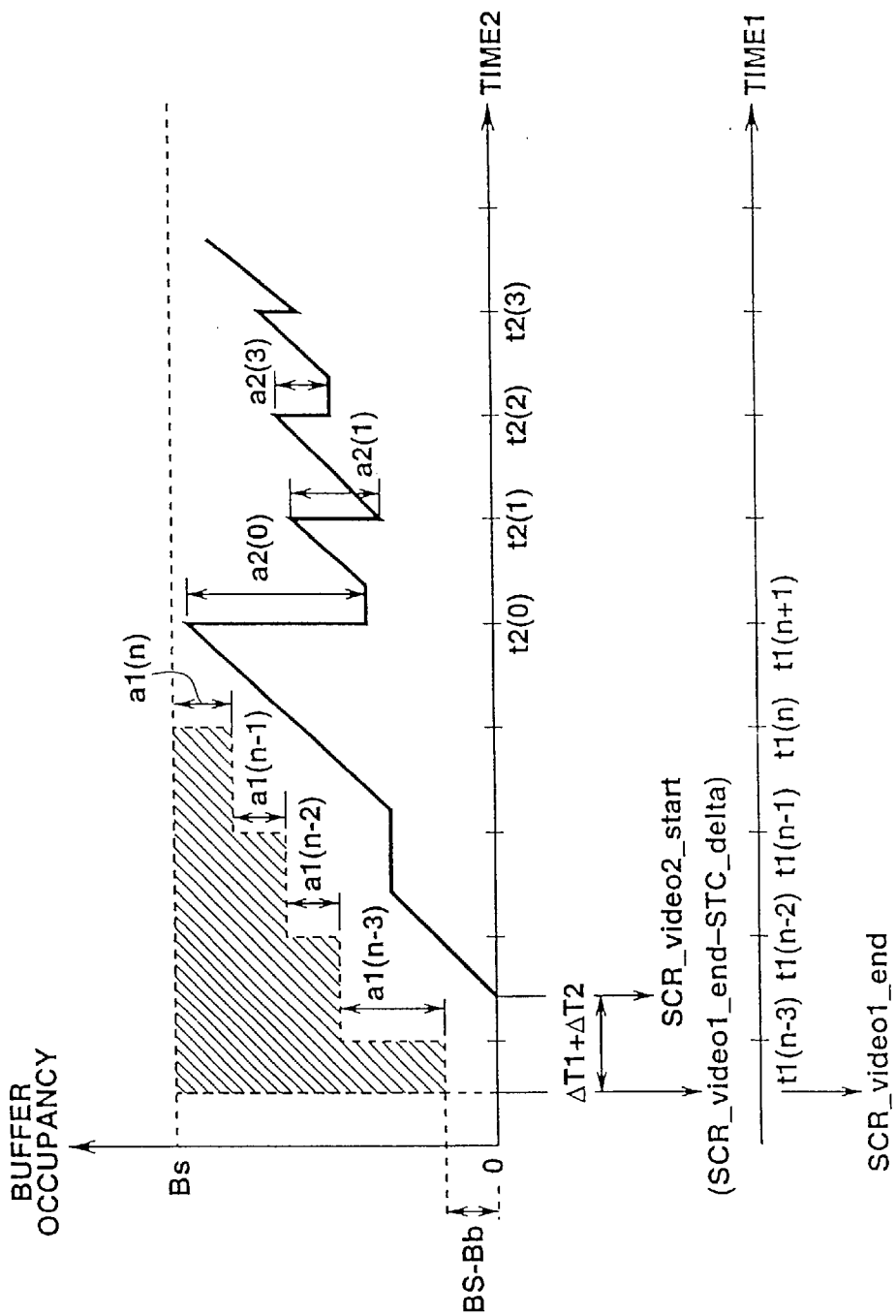
FIG. 9 illustrates the bit occupancy variation of a video buffer of the system target decoder when an in-point program is supplied to the video buffer.
Figures 10A, 10B:
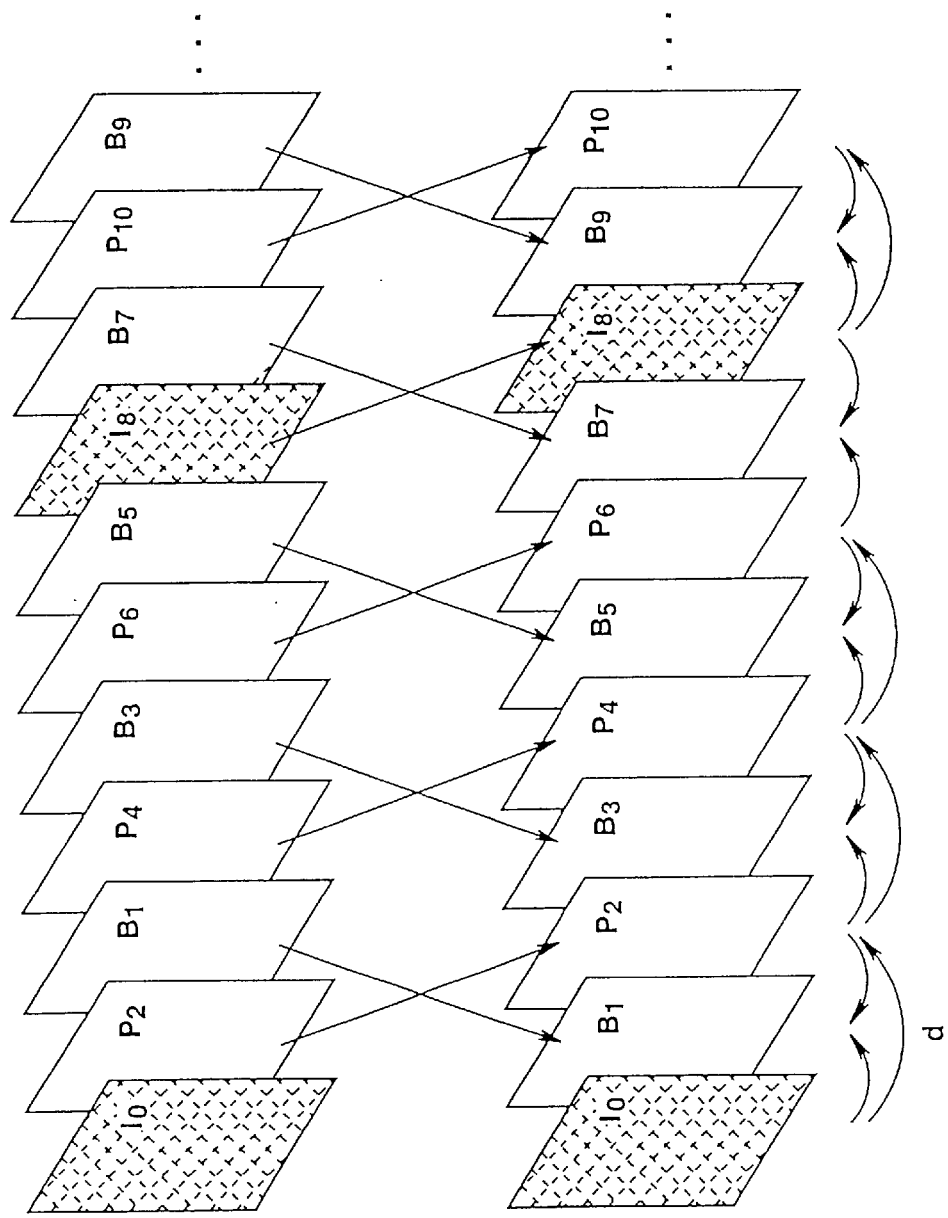
FIGS. 10A and 10B show the arrangement of pictures coded by the MPEG method.
Figure 11:
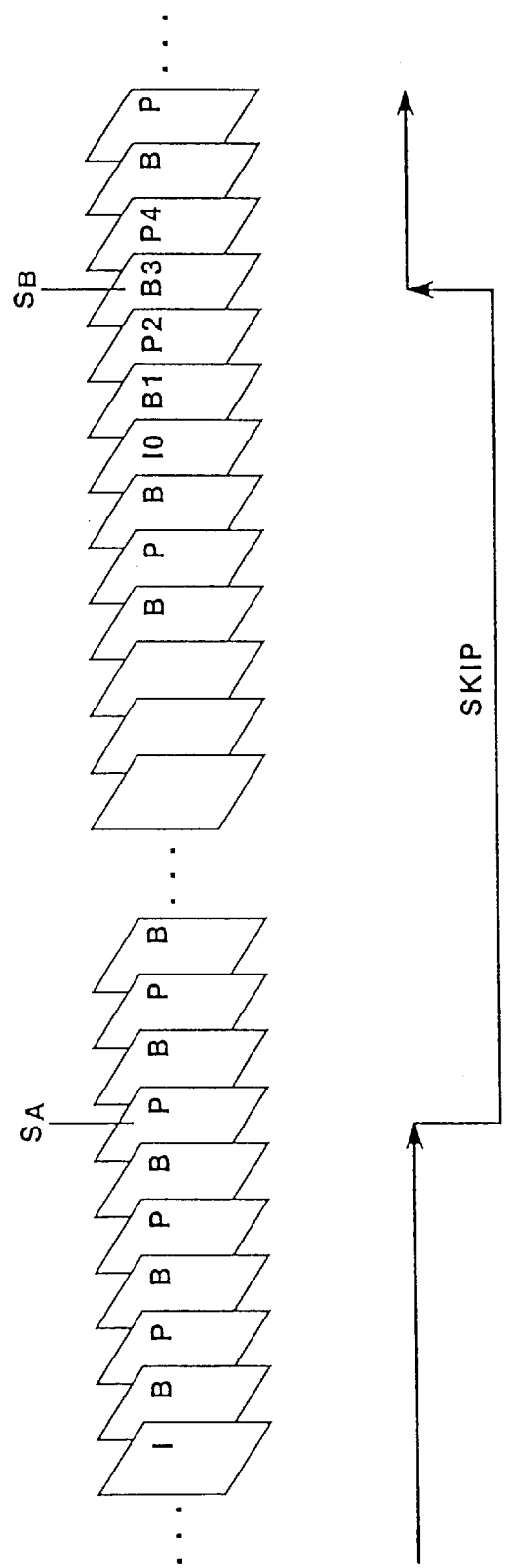
FIG. 11 illustrates a skipping production of data coded by the MPEG method.

FIG. 9 shows a change in bit occupancy of the multiplexed stream in Clip-2 in video buffer 22 in system target decoder 20. In FIG. 9, a time on the time base of Clip-2 is indicated along a horizontal axis "TIME2" and the bit occupancy in video buffer 22 is indicated along a vertical axis. The value of Bs is 232 kbytes, for example, as prescribed in the MPEG-2 standard (MP@ML).

In FIG. 9, "a2(i)" indicates a bit amount of an i-th coded picture in the decoded order for Clip-2. "t2(i)" indicates a time at which "a2(i)" is decoded and its value is added as a DTS in the bit stream. "a2(0)" indicates a bit amount of a first picture to be decoded in Clip-2, and "t2(0)" indicates a time at which "a2(0)" is decoded. The time zone in which the buffer occupancy ascends to the right indicates that data is supplied to the video buffer 22 at the bit rate of Clip-2 (program_mux_rate2). The linear (horizontal) time zone with no gradient indicates that data supply to video buffer 22 is stopped.

At time SCR_video2_start, supply to video buffer 22 of data of the first video pack (first video pack of bridge sequence-B shown in FIG. 4) in Clip-2 is started. Time SCR_video2_start is one indicative of the SCR added in the first video pack in Clip-2, and it should satisfy the aforementioned relation (6).

The locus of bit occupancy of Clip-2 is limited by the bit occupancy at the end portion of Clip-1 in video buffer 22. That is, in case video packets in Clip-2 are supplied to video buffer 22 after supply of those in Clip-1 with the time bases of Clip-1 and Clip-2 converted to the same time base, the video packets in Clip-2 should be supplied to video buffer 22 within a limited time period in order to prevent video buffer 22 from overflowing and underflowing.

In FIG. 9, TIME2=SCR_video1_end−STC_delta is a time resulting from the conversion of TIME1=SCR_video1_end to a value on TIME2. "STC_delta" is a value defined by the aforementioned relation (3). The hatched region above the staircase locus starting at TIME2=SCR_video1_end−STC_delta indicates a change in bit occupancy of the video data in the end portion of Clip-1. For no overflow of video buffer 22 when supplied with video packets in Clip-2 continuously after supply from Clip-1, bridge sequence-B should be re-encoded and re-multiplexed in such a manner that the locus of the bit occupancy of Clip-2 in FIG. 9 is under the hatched region.

The above relation can be expressed as follows:

$$b1(time1)+b2(time1-STC\_delta) <= BS \qquad (9)$$

where "b1" is a variation in bit occupancy of video packets in the P-STD at time "TIME1" on the time base of Clip-1, and "b2" is a variation in bit occupancy in the video buffer in the P-STD at the time "TIME2=TIME1−STC_delta" on the time base of the Clip-2.

The video stream of Clip-2 is not input through the term ΔT1+ΔT2 after Clip-1 has been completely inputted to the video buffer. The buffer still has video data of Clip-1 just after input of Clip-2 is started. Therefore, the bit rate of encoding the Clip-2 video data and the input timing of the Clip-2 video data to buffer are controlled in order not to overflow/underflow the buffer. The video data of Clip-1 is extracted from buffer at the time of the DTS. When all of the Clip-1 video data is decoded, the buffer has no Clip-1 video data and has only Clip-2 data. And then, encoder and multiplexer perform as usual.

As described above, apparatus 1 is adapted to limit the rate control of a bridge sequence generated by re-encoding and re-multiplexing the bridge sequence, thereby the bit occupancy in the video buffer for a period from the time at which supply of video streams in Clip-2 to the video buffer of the decoder is started until a time at which decoding of video streams in Clip-1 is ended is smaller than the capacity of the video buffer and greater than zero. This limitation enables skipping reproduction with the continuity of a moving image before and after the skip point and the continuity of the reproduction without overflowing and underflowing the video buffer of the decoder during the skipping reproduction.

An example in which a decoded bridge sequence is encoded to have a high quality will be described hereinbelow.

(t(n+1)−SCR_video1_end), for example, in FIG. 8 is made as large as possible.

To this end, the program stream should be multiplexed in such a manner that supply of video streams in Clip-1 to the buffer is completed as early as possible.

Also, the hatched region, for example, in FIG. 9 should be made as small as possible, taking the quality of Clip-1 in consideration.

The larger the hatched region, the larger the data amount for supply to the video buffer is limited for the period from "TIME2=SCR_video2_start" until "t2(0)". Namely, the larger the hatched region, the bit amount of pictures should be decreased during re-encoding of video streams in the bridge sequence in Clip-2. More specifically, if there exists an I picture within two or three frames from the last picture in Clip-1, the hatched region will possibly be large. In such a case, the I picture can be changed to a P picture and re-encoded as will be described below to reduce the bit amount. Thus, the hatched region can be made smaller.

Before improvement: I2 B0 B1 P5 B3 B4 P8 B6 B7 I11 B9 B10

After improvement: I2 B0 B1 P5 B3 B4 P8 B6 B7 P11 B9 B10

As having been described in the foregoing, the multiplexer and multiplexing method according to the present invention are adapted to encode the video streams for a period from a time at which supply of video streams in Clip-2 to the video buffer of the decoder is started until a time at which supply of video streams in Clip-1 to the video buffer of the decoder is finished so that the bit occupancy in the video buffer is smaller than the capacity of the video buffer and greater than zero.

Thus, the multiplexer and multiplexing method according to the present invention assure a skipping reproduction with the continuity of a moving image before and after a skip point as well as a continuity of the reproduction without overflowing and underflowing the video buffer of the decoder during the skipping reproduction.

Also, the recording medium according to the present invention has recorded thereon a first video code stream and a second video code stream so that the bit occupancy in a video buffer of a decoder for a period from a time at which supply of video streams in the second video coded stream to the video buffer of the decoder is started until a time at which decoding of a last picture in the first video coded stream is ended, is smaller than the capacity of the video buffer and greater than zero.

Thus, the recording medium according to the present invention allows a player for the recording medium to assure a skipping reproduction with the continuity of a moving image before and after a skip point as well as a continuity of the reproduction without overflowing and underflowing the video buffer of the decoder during the skipping reproduction.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense. For example, although the illustrative embodiment described above applies to a program stream, it is appreciated that the invention may also be applied to a transport stream.

It is also to be understood that the following claims are intended to cover all of the generic and specific features of the invention herein described and all statements of the scope of the invention which, as a matter of language, might be said to fall therebetween.

What is claimed is:

1. A recording medium used to display stored data, comprising:

a first multiplexed stream including at least a first video coded stream and a first audio coded stream synchronous with the first video coded stream; and a second multiplexed stream including at least a second video coded stream and a second audio coded stream synchronous with the second video coded stream;

wherein the first and second video coded streams are limited so that a time ($SCR\_video2\_start$) on a time base of the second video coded stream at which supply of a first video pack in the second multiplexed stream to the video buffer of the decoder is started, satisfies a relation:

$$SCR\_video2\_start > SCR\_video1\_end - STC\_delta + \Delta T1;$$

based on a time difference ($STC\_delta = PTS\_P\ OUT\_end - PTS\_P\ IN$) between a time ($PTS\_P\ OUT\_end$) at which display of the first picture on a time base of the first video coded stream is ended and a time ($PTS\_P\ IN$) at which display of the second picture on the time base of the second video coded stream, a time ($SCR\_video1\_end$) on the time base of the first video coded stream at which supply of a last video pack in the first multiplexed stream to the video buffer of the decoder, is ended, a data amount (N1) from a pack next to the last video pack in the first multiplexed stream to a last pack in the first multiplexed stream, and a time ($\Delta T1$) for the data amount (N1) to be supplied to the decoder;

wherein the display of said first video coded stream ends with a first picture, and the display of said second video coded stream begins with a second picture which is displayed following the first picture during skipping reproduction, in such a manner for a period from a time at which the second video coded stream starts being supplied to a video buffer of a decoder until a time at which a decoding of a last coded picture in the first video coded stream ends, a bit occupancy in the video buffer being below maximum capacity and larger than zero.

2. A method of multiplexing video/audio data, comprising the steps of:

multiplexing at least a first video coded stream and a first audio coded stream synchronous with the first video coded stream to produce a first multiplexed stream; and multiplexing at least a second video coded stream and a second audio coded stream synchronous with the second video coded stream to produce a second multiplexed stream;

wherein the first and second video coded streams are limited so that a time ($SCR\_video2\_start$) on a time base of the second video coded stream at which supply of a first video pack in the second multiplexed stream to the video buffer of the decoder is started, satisfies a relation:

$$SCR\_video2\_start > SCR\_video1\_end - STC\_delta + \Delta T1;$$

based on a time difference ($STC\_delta = PTS\_P\ OUT\_end - PTS\_P\ IN$) between a time ($PTS\_P\ OUT\_end$) at which display of the first picture on a time base of the first video coded stream is ended and a time ($PTS\_P\ IN$) at which display of the second picture on the time base of the second video coded stream, a time ($SCR\_video1\_end$) on the time base of the first video coded stream at which supply of a last video pack in the first multiplexed stream to the video buffer of the decoder, is ended, a data amount (N1) from a pack next to the last video pack in the first multiplexed stream to a last pack in the first multiplexed stream, and a time ($\Delta T1$) for the data amount (N1) to be supplied to the decoder;

wherein the display of said first video coded stream ends with a first picture, and the display of said second video coded stream begins with a second picture which is displayed following the first picture during skipping reproduction, in such a manner for a period from a time at which the second video coded stream starts being supplied to a video buffer of a decoder until a time at which a decoding of a last coded picture in the first video coded stream ends, a bit occupancy in the video buffer being below maximum capacity and larger than zero.

3. An apparatus for processing video/audio data, comprising:

a demultiplexer for demultiplexing a first multiplexed video stream into a first video coded stream and a first audio coded stream synchronous with the first video coded stream and a second multiplexed video stream into a second video coded stream and a second audio coded stream synchronous with the second video coded stream;

a time controller for supplying a first video coded stream and a second video coded stream to a video buffer; and a video decoder for decoding and outputting the first video coded stream and the second video coded stream from the video buffer such that said first video coded stream ends with a first picture, and said second video coded stream begins with a second picture which is displayed following the first picture during skipping reproduction;

wherein the first and second video coded streams are limited so that a time (SCR_video2_start) on a time base of the second video coded stream at which supply of a first video pack in the second multiplexed stream to the video buffer is started, satisfies a relation:

$$SCR\_video2\_start > SCR\_video1\_end - STC\_delta + \Delta T1;$$

based on a time difference (STC_delta=PTS_P OUT_end−PTS_P IN) between a time (PTS_P OUT_end) at which output of the first picture on a time base of the first video coded stream is ended and a time (PTS_P IN) at which output of the second picture on the time base of the second video coded stream, a time (SCR_video1_end) on the time base of the first video coded stream at which supply of a last video pack in the first multiplexed stream to the video buffer of the decoder, is ended, a data amount (N1) from a pack next to the last video pack in the first multiplexed stream to a last pack in the first multiplexed stream, and a time ($\Delta T1$) for the data amount (N1) to be supplied to the video decoder.

* * * * *